United States Patent [19]

Enomoto

[11] 4,114,988

[45] Sep. 19, 1978

[54] MIRROR ANGLE ADJUSTING DEVICE, WITH CONSECUTIVELY DRIVEN WORMS IN REMOTELY CONTROLLED REAR-VIEW MIRROR APPARATUS

[75] Inventor: Masao Enomoto, Isehara, Japan

[73] Assignee: Ichikoh Industries, Limited, Tokyo, Japan

[21] Appl. No.: 835,284

[22] Filed: Sep. 20, 1977

[30] Foreign Application Priority Data

Oct. 21, 1976 [Ja] Japan .................. 51-125519

[51] Int. Cl.$^2$ ............................................. G02B 7/18
[52] U.S. Cl. .................................................. 350/289
[58] Field of Search ...................... 350/289, 6.6, 285

[56] References Cited

U.S. PATENT DOCUMENTS

| 3,609,014 | 8/1971 | Kurz | 350/289 |
| 3,613,464 | 10/1971 | Archer | 350/285 |
| 3,628,862 | 12/1971 | Stephenson | 350/289 |

*Primary Examiner*—Jon W. Henry
*Attorney, Agent, or Firm*—Cushman, Darby & Cushman

[57] ABSTRACT

A mirror angle adjusting device in remotely controlled rear-view mirror apparatus for automobile is arranged that: a supporting plate of the mirror is fixed to the ball of a ball-and-socket joint; a shaft extending from the ball is inserted in the through-hole defined by the two perpendicularly crossing elongated slots of two perpendicularly crossing slidable bars, and the device is operative so that the slidable bars are caused to make reciprocal movements by their mating motors to displace the position of the above-said through-hole, whereby the supporting plate of the mirror is inclined about the ball-and-socket joint. The rotation speeds of the motors are reduced by two sets of worm gears, and the speed-reduced rotations of the motors are converted to reciprocal motions by two sets of rack-and-pinion gears to cause the slidable bars to make the above-said reciprocal movements. Each of the worm wheels of the worm gears contains therein a slipping mechanism for preventing over-load operation of the motors.

7 Claims, 10 Drawing Figures

MIRROR ANGLE ADJUSTING DEVICE, WITH CONSECUTIVELY DRIVEN WORMS IN REMOTELY CONTROLLED REAR-VIEW MIRROR APPARATUS

BACKGROUND OF THE INVENTION (a) Field of the Invention:

The present invention concerns a remotely controlled rear-view mirror apparatus for use in an automobile, and more particularly it pertains to a mirror angle adjusting device for such rear-view mirror apparatus.

(b) Description of the Prior Art: In a remotely controlled rear-view mirror apparatus for use in an automobile, it is desired that, after the mirror has been tilted or adjusted in position through a desired angle, the mirror is continuously held stationary in its adjusted position. This state of the mirror includes that the mirror is not displaced easily from the adjusted position due to the vibrations of the body of the automobile and/or to the externally applied impacts from a person or an object.

Japanese Laid-Open Utility Model Application Specification No. SHO 47-846 discloses a mirror angle adjusting device for use in an automobile, which is arranged so that: a mirror is supported on a ball-and-socket joint; two slidable bars have elongated slots, respectively, which slots are arranged to cross each other; a shaft extending from the ball which constitutes the ball-and-socket joint is inserted in a through-hole defined by the crossing elongated slots of said bars; the slidable bars are moved from motors via spur gears to displace the position of the said through-hole of the crossing elongated slots, whereby to cause the mirror to tilt in any desired direction. Such a known mirror angle adjusting device, however, will allow the mirror to be easily displaced from its adjusted position whenever vibrations which develop during the running of the automobile are transmitted to the mirror, or whenever an external impact is applied to the mirror, or whenever an impact produced by the opening and closing of the door is applied to the mirror.

Another problem which is inherent to such known device is that, whenever a resistance of some nature or other or a disorder develops in either the mirror or the mechanism including the mirror through the motor, there is caused a breakage of such mechanism or burning of the motor.

On the other hand, in such known remotely controlled rear-view mirror apparatus, disorder of the motor and the above-said mechanism cannot be prevented from taking place. This is because the motor and the mechanism are unable to prepare themselves beforehand to meet all kinds of situations, i.e. the various operations done by the user and the state in which the mirror is being used. In such a case, there arises the necessity that the mirror can be adjusted manually. Furthermore, it is necessary that, continuously after the mirror has been adjusted in position manually, the mirror can be held firmly in its adjusted position. With the mirror angle adjusting device of the prior art, however, it is extremely difficult to satisfy these requirements.

SUMMARY OF THE INVENTION

It is, therefore, a primary object of the present invention to provide a mirror angle adjusting device in a remotely controlled rear-view mirror apparatus for use in an automobile, which insures that, even when an external force is applied to the mirror, the mirror is held firmly in its adjusted position.

Another object of the present invention is to provide a mirror angle adjusting device of the type described above, which, even when a resistance or a disorder develops in the mirror or in the mirror-to-motor mechanism during the operation of tilting the mirror, is able to prevent the occurrence of an over-load operation of the motors, and which, even when a disorder of the motor takes place, allows the mirror to be adjusted manually.

Still another object of the present invention is to provide a mirror angle adjusting device of the type described above, which insures that the tilting of the mirror can be carried out smoothly for an extended period of time without any difficulty with a constant resistance or a constant torque of revolution.

Yet another object of the present invention is to provide a mirror angle adjusting device of the type described, which, even when an external force is forcibly applied to the mirror either during the tilting of the mirror or after the mirror has been tilted, insures that the mirror is allowed to be tilted only in predetermined directions, whereby the adjusting operation can be carried out unfailingly at all times.

A further object of the present invention is to provide a mirror angle adjusting device of the type described above, which can be constructed in an extremely compact size and form, enabling the rear-view mirror apparatus as a whole to be made into a compact size and to have any free style.

A still further object of the present invention is to provide a mirror angle adjusting device of the type described above, which can be fabricated extremely easily.

These and other objects as well as the features and the advantages of the present invention will be apparent by reading the detailed description of the preferred embodiments of the present invention when taken in conjunction with the drawings.

DETAILED DESCRIPTION OF THE PREFERRED EMBODIMENTS

Figure 1:
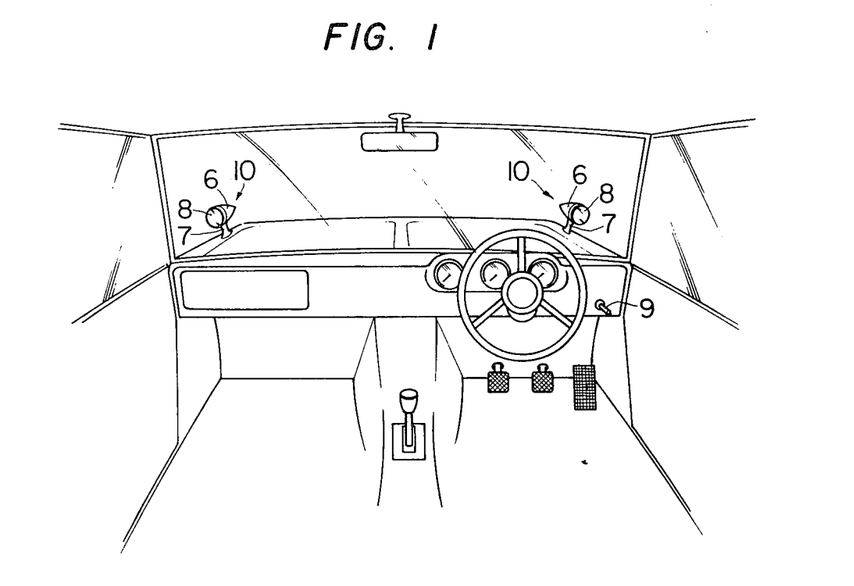
FIG. 1 is a view taken from the driver's seat in an automobile, showing the state in which a rear view mirror apparatus having the mirror angle adjusting device of the present invention mounted on the front fender of the automobile.
Figure 2:
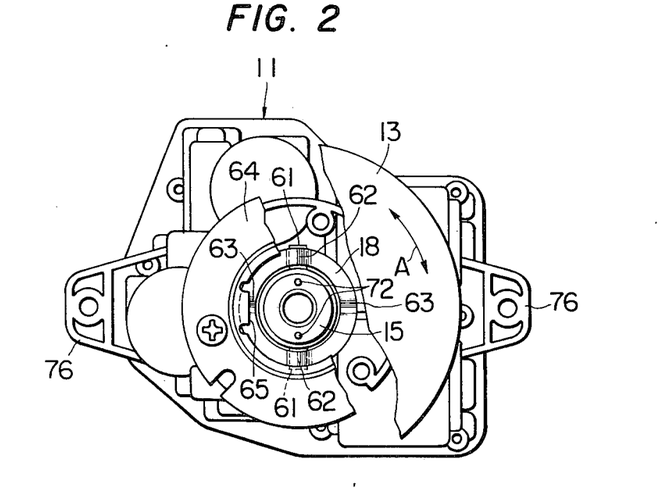
FIG. 2 is a front view of the mirror angle adjusting device of the present invention, partly broken away and exposing the mechanism contained thereinside.
Figure 3:
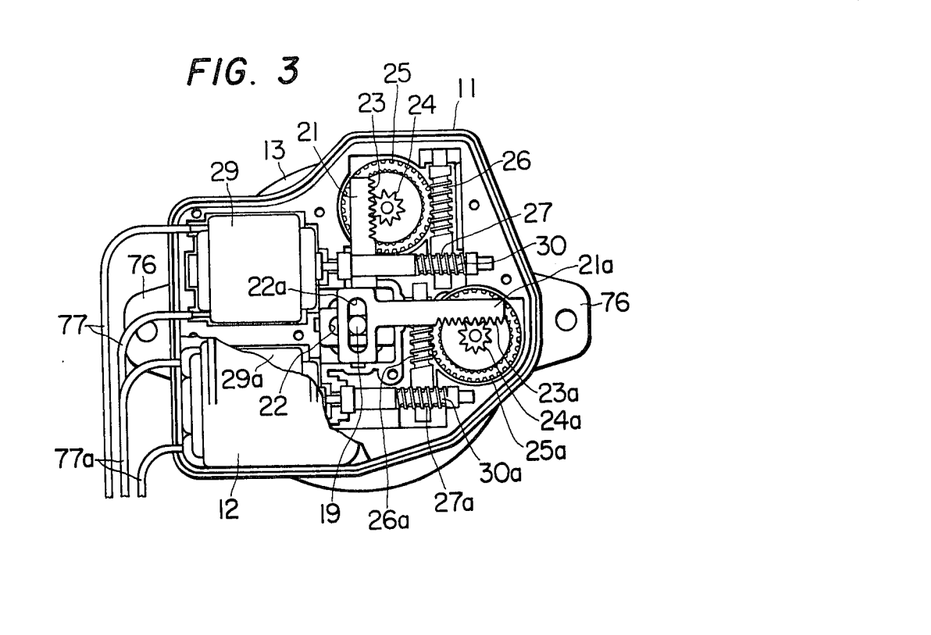
FIG. 3 is a rear side view of same, partly broken away and exposing the mechanism contained thereinside.
Figure 4:
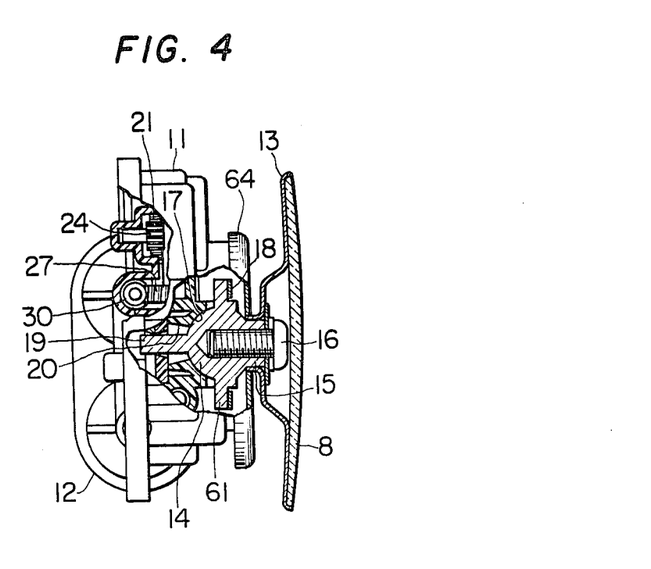
FIG. 4 is a side view of the mirror angle adjusting device of the present invention, partly broken away, and showing a part thereof in a central vertical section.
Figure 5:
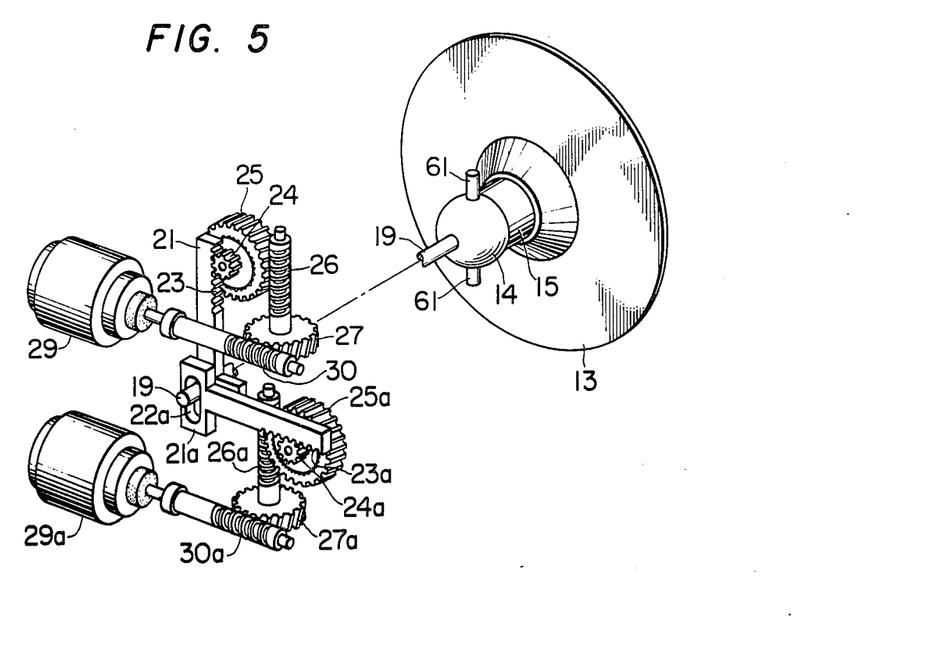
FIG. 5 is a perspective view of the essential parts of the driving mechanism of the mirror angle adjusting device of the present invention to briefly explain the mechanism, somewhat modified relative to other figures.

The mirror angle adjusting device according to the present invention is mounted within a rear-view mirror apparatus shown at 10 in FIG. 1. This rear view mirror apparatus 10 is shown to have a housing 6 of a cannon ball shape. This rear view mirror apparatus 10 is firmly mounted onto the body of an automobile by fixing the base of a leg 7 which is integral with said housing to either a fender or a wing of the automobile. A mirror 8 is arranged at the opening of the housing 6 and is held by the mirror angle adjusting device of the present invention which is arranged within this housing 6, whereby the mirror 8 is adapted to be adjusted of its angle as required from the driver's seat in association with the operation of switch means 9 which is also provided within the driver's chamber.

FIGS. 2 to 9 show the details of the mirror angle adjusting device according to the present invention. A frame 11 is fixed with the housing 6. On one side of this frame 11, there is supported a mirror 8 by a ball-and-socket joint. A driving mechanism is provided on the other side of the frame. The driving mechanism is enclosed in sealed fashion by a cover 12 which is placed on the entire frame 11.

That side of the mirror 8 located opposite to the side where the mirror surface is provided is bonded or secured to its attachment or supporting plate 13. This attachment plate is fixed to a ball 14 of the ball-and-socket joint for free rotation in any desired direction. The ball 14 of this ball-and-socket joint is held in a ball-receiving seat 17 which is provided on the frame 11. A shaft 19 extends from the ball 14, and this shaft 19 further extends to the opposite side of the frame 11 after passing through an opening 20 which is formed in the ball-receiving seat 17.

On the opposite side of the frame 11 is provided slidable bars 21 and 21a which are arranged to cross each other at right angle. These two slidable bars are provided with slots 22 and 22a, respectively, which cross each other at right angle, respectively. The shaft 19 of the ball 14 is passed through the crossing point of these two slots 22 and 22a. Due to this arrangement, it will be understood that, as the slidable bars 21 and 21a are displaced, the position of the crossing point of the slots will be displaced accordingly, so that the ball 14 is rotated thereby, causing the attachment plate 13 of the mirror 8 to tilt.

The respective slots 22 and 22a are arranged so that, when the rear view mirror apparatus 10 is installed onto the body of the automobile, these slots will allow the mirror 8 to be rotated about a vertical axis and also about a horizontal axis extending in the direction of the width of the body of the automobile. Because of this arrangement, it will be understood that, by the displacement of the respective slidable bars 21 and 21a, the mirror 8 is provided not only in the right and left and the upper and down directions, but also is tilted in upper slant directions as well as lower slant directions.

The respective slidable bars 21 and 21a have arms, respectively, which extend in the directions crossing each other. These arms constitute racks 23 and 23a, respectively. These racks engage their mating pinion gears 24 and 24a respectively. The respective pinions are attached to worm wheels 25 and 25a, respectively, for rotation therewith. The respective worm wheels 25 and 25a engage their worms 26 and 26a, respectively. These respective worms 26 and 26a are provided coaxially on their worm wheels 27 and 27a, respectively, for rotation therewith. Worms 30 and 30a are secured to the shafts of electric motors 29 and 29a, respectively. These worms 30 and 30a engage their mating worm wheels 27 and 27a, respectively. In the respective driving mechanisms which are associated with the respective slidable bars 21 and 21a, the rotation of the electric motors is reduced in speed by the two sets of worm gears and is further reduced in speed and the speed-reduced revolutions are converted to reciprocal motions, respectively, to cause the slidable bars to make reciprocal movements.

One set of these two sets of worm gears, desirably two sets of worm gears, preferably possesses one-way motion transmitting function. More particularly, the angle of lead at the pitch of the worm and the angle of friction on the surface of thread thereof are selected in such a manner as to insure that the rotation of the worm is transmitted to the worm wheel, but conversely the rotation of the worm wheel is not transmitted to the worm. By this arrangement, the attachment plate 13 can be tilted from the electric motors, but when an external force is applied to this attachment plate 13, the latter can be prevented from its being tilted by the worm gears.

The slidable bars 21 and 21a are fitted, in superposed fashion relative to each other, on the inside of a guide wall 41 which is formed on the frame 11. The arms which constitute racks and are provided for the respective slidable bars extend to the outside of the guide wall 41 through a cutout 42, 42a which is formed in said guide wall, respectively. These arms are arranged to cross their mating slots at right angle, respectively. Rack gears 23 and 23a, are formed on one side of these respective arms. Pinion gears 24 and 24a are mounted on the worm wheels 25 and 25a coaxially therewith, respectively.

One unit of a pinion gear 24 and a worm wheel 25 is accommodated in a recess 43 formed in the frame 11. This recess 43 has an inner diameter which is slightly larger than the outer diameter of the worm wheel 25. This recess has, at its bottom, a shaft 44 which passes through both the pinion gear 24 and the worm wheel 25. A cover 12 of the recess 43 is provided with a projection 81 which urges against the side surfaces of both the pinion gear and the worm wheel mentioned above. By this projection 81, the unit of the pinion gear 24 and the worm wheel 25 is positioned in place and also rotatably held on the frame 11 and the cover 12.

A worm 26 and a worm wheel 27 are arranged coaxially, and they are formed integrally. These members are accommodated within another recess 45 which, in turn, is formed also on the frame 11. The shaft portions which extend at the opposite ends of the assembly of the worm 26 and the worm wheel 27 are rotatably supported by a semi-circular bearing 46 which is formed on the frame 11 and by another semi-circular bearing 82 which is provided on the cover 12. These worm 26 and worm wheel 27 are arranged in parallel with the rack or the arm 23. On the other hand, the worms 30 has its shaft portions provided at its opposite ends, and these shaft portions are supported rotatably by a semi-circular bearing 47 which is formed on the frame 11 and by another semi-circular bearing 83 which is provided on the cover 12, and they are arranged so as to bridge the base portion of the arm 23, the worm 26 and the worm wheel 27. An electric motor 29 is held by the recess 48 of the frame 11 and also by the recess 84 of the cover 12. A worm 30 is mounted on the shaft of this motor 29. The shaft of the motor 29 and the hole of the worm through which the shaft of this motor is inserted both have a cross section of a circle having a cut-out. Thus, only by mounting the worm 30 onto the shaft of the motor 29, the motive power of this motor 29 is transmitted to the worm 30. In addition to this arrangement, it should be noted that the slidable bar 21 and the pinion gear 24 are arranged between the worm 30 and the worm wheel 25, the worm 26 and the worm wheel 27, or in other words, they are arranged in planes which are different relative to each other, so that the driving mechanism as a whole is structured in a compact size with respect to the depth, the breadth and the height thereof. Also, the respective constituting elements 22a–29a of another set of driving mechanism associated with the slidable bar 21a is also constructed in the similar way as the mechanism described just above. These elements are held and arranged either by the recess formed on the frame and also by the semi-circular bearings 43a–48a which are formed on the frame 11 and also by either the projection of the cover or the semi-circular bearing 81a–84a of the cover. However, the unit comprising the worm 26a and the worm wheel 27a crosses the arm of the slidable bar 21a at right angle, whereas the worm 30a is arranged in parallel with this arm.

The fabrication of the driving mechanisms of the rear view mirror apparatus is carried out in the manner described below. The worm wheels 25 and 25a are fitted in the recesses 43 and 43a of the frame 11 jointly with the pinion gears 24 and 24a, and the slidable bars 21 and 21a are placed successibely in the guide wall 41, then the two units of the worm 26 and the worm wheel 27 and the worm 26a and the worm wheel 27a are fitted in the recesses 45 and 45a of the frame 11, respectively, and the worms 30 and 30a are placed on the semi-circular bearings 47 and 47a, respectively. Along therewith, the electric motors 29 and 29a are placed in the recesses 48 and 48a, respectively. Then, the cover 12 is fitted onto the frame 11. As a result, the respective constituting elements are held in place, respectively, and along therewith the respective elements are brought into engagement with each other. This arrangement of the driving mechanisms allow the operator to get access to the device at one side thereof for any kind of operation, and yet with a great easiness. It should be noted also that the cover 12 is fixed to the frame 11 by forcing a pin 85 of this cover into a hole which is provided in the frame in a corresponding position. As stated, the fabrication of the mechanisms can be accomplished only by successive assemblying of the respective elements or parts into the pre-fabricated recesses or projections of the frame. Moreover, the whole fabricating operation can be performed on one side of the frame. Thus, it is possible to accomplish the fabrication quite easily.

Figure 6:
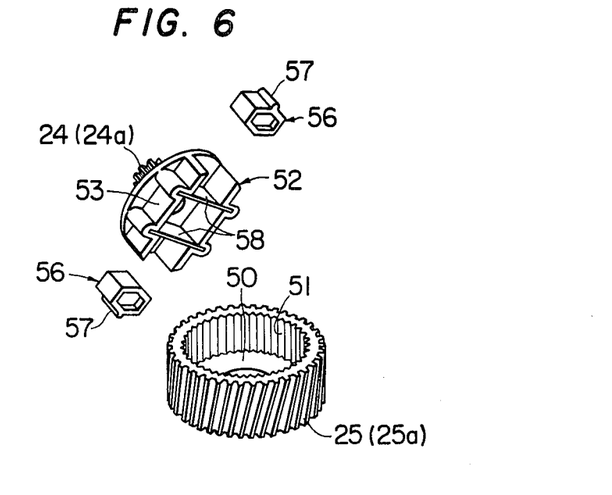
FIG. 6 is an exaggerated fragmentary perspective view showing the details of the overload operation preventing mechanism or slip mechanism employed in the driving mechanism.
Figure 7:
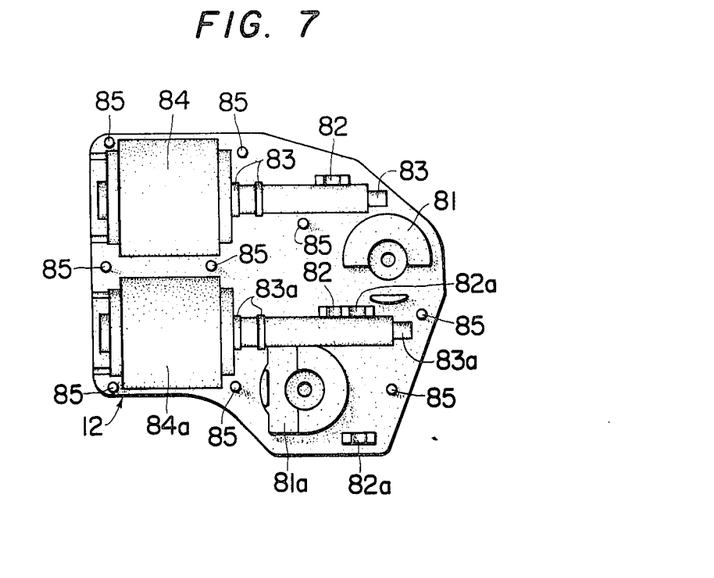
FIG. 7 is a plan view of the cover of the device.
Figure 7A:
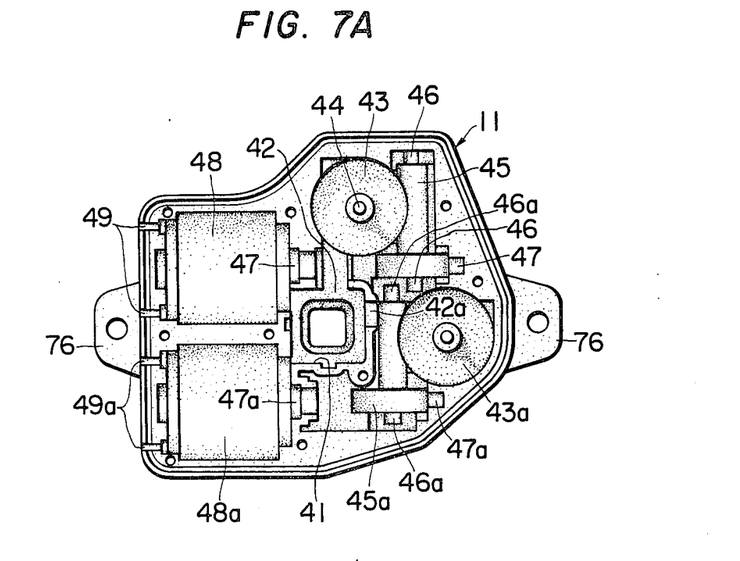
FIG. 7A is a plan view showing the arrangement of the frame of the device.

In the mirror angle adjusting device of the present invention, in order to prevent the occurrence of damage of the electric motors due to burning, there are provided slip mechanisms between the pinion gears 24, 24a and the first worm wheels 25, 25a, respectively. These slip mechanisms can have various kinds of structure. Such a slip mechanism, however, desirably is capable of not preventing the corresponding electric motor from overload operation, when there develops a resistance or a disorder in the mechanism ranging from the mirror up to the electric motor, during the running of this electric motor, but also allows the mirror to be adjusted of its angle manually at the time of a disorder of the electric motor, and also is able to avoid a large-sized structure as well as a complexity of the device as a whole. FIG. 6 shows the details of a preferred example of such slip mechanism. The worm wheel 25 is provided with a tubular hole 50. On the inner circumference of this tubular hole 50 are formed a number of teeth 51. On the other hand, the pinion gears 24 is fixed to disks 52 which, in turn, is fitted in the tubular hole formed in the worm wheel 25. The positions at which the disks 52 is fitted in the tubular hole of the worm wheel 25 is limited by a block 53 which has a height corresponding to the depth of the tubular holes and which is provided on the rear side of the disk 52. Each block has movable pieces 56 and 56 which are allowed to move against and toward each other. Each of these movable pieces 56 and 56 has a small projection 57 which engages the teeth 51 which are formed on the inner circumference of the worm wheel 25. The engagement of this projection 57 with the inside teeth of the worm wheel is maintained by leaf springs 58 and 58 which are held in the block 53 as the leaf spring urge the movable pieces against the inside teeth of the worm wheel. As the worm wheel 27 is rotated, the associated pinion gear 24 is rotated along therewith. Even when the rotation of the pinion gear 24 is disturbed by some reason or other, the movable piece is moved against the spring force of the leaf spring, and at the same time therewith, the engagement between the projection and the teeth is released thereby, so that the worm wheel 25 is allowed to rotate. A mechanism having a similar arrangement is provided between the pinion 24a and the worm wheel 25a.

For the foregoing reason, when an external force is applied to the mirror during the tilting operation of this mirror, it will be understood that only the slidable bar and its mating pinion gear are rendered to a locked state, so that the worm wheel is allowed rotate. As a result, the entire mechanism as well as the electric motor are not given any forced load. Even when the mirror has been tilted by an external force up to its maximum angle of tilting, neither the mechanism nor the electric motor is given any forced load. Not only that, but also because of the fact that the mirror and the slidable bar plus its mating pinion gear are in the locked state, it will be noted that even when the worm wheel is rotated, the mirror is not caused to rotate by this worm wheel, and that the mirror is firmly held in its position. Furthermore, even when the electric motor becomes disordered, it is possible to manually tilt the mirror. In such an instance, the slidable bar and its mating pinion gear are rotated, but the worm wheel is not rotated. Therefore, the mirror is able to firmly hold its tilted position.

Such a slip mechanism as stated above allows, in the automatic one-way motion relationship between the worm and its mating worm gear which has been stated above during the inoperative state of the motor, that the mirror will not be displaced in its position by virtue of said automatic one-way motion function even when an external impact of a magnitude below the value set for the slip mechanism is applied to the mirror by the vibrations of the body of the automobile or by a person or by an external object. It is only when a load or an impact having a magnitude greater than the set value has been applied to the mirror during the inoperative state of the motor that the mirror is caused to be displaced.

The slip mechanism stated above is of the arrangement that it can be easily fabricated or assembly by fitting the leaf spring 58, 58 into the slit provided in the block 53, and then by causing the movable piece 56 to engage a guide in the block 53, and then by fitting the tubular hole 50 of the worm onto the disk 52.

As stated above, in the mirror angle adjusting device according to the present invention, the mirror is supported on both the ball-and-socket joint and the slidable bar, and the tilting of the mirror which is initiated on the mirror side is prevented, though to a certain extent, by the provision of the worm gear. Therefore, the mirror is extremely stable against externally applied vibrations or impact. Thus, the mirror faithfully keeps its adjusted position, and along therewith it is possible to minimize the development of blurring of image on the mirror.

These advantages can be insured to be further positive by constructing the ball-and-socket joint in the manner described later. Moreover, it is possible, even when the mirror has not a circular configuration, to prevent the mirror from rotating about a horizontal axis lying in the longitudinal direction of the body of the automobile, i.e. the rotation in the directions shown by the arrows in FIG. 2.

Figures 8, 9:
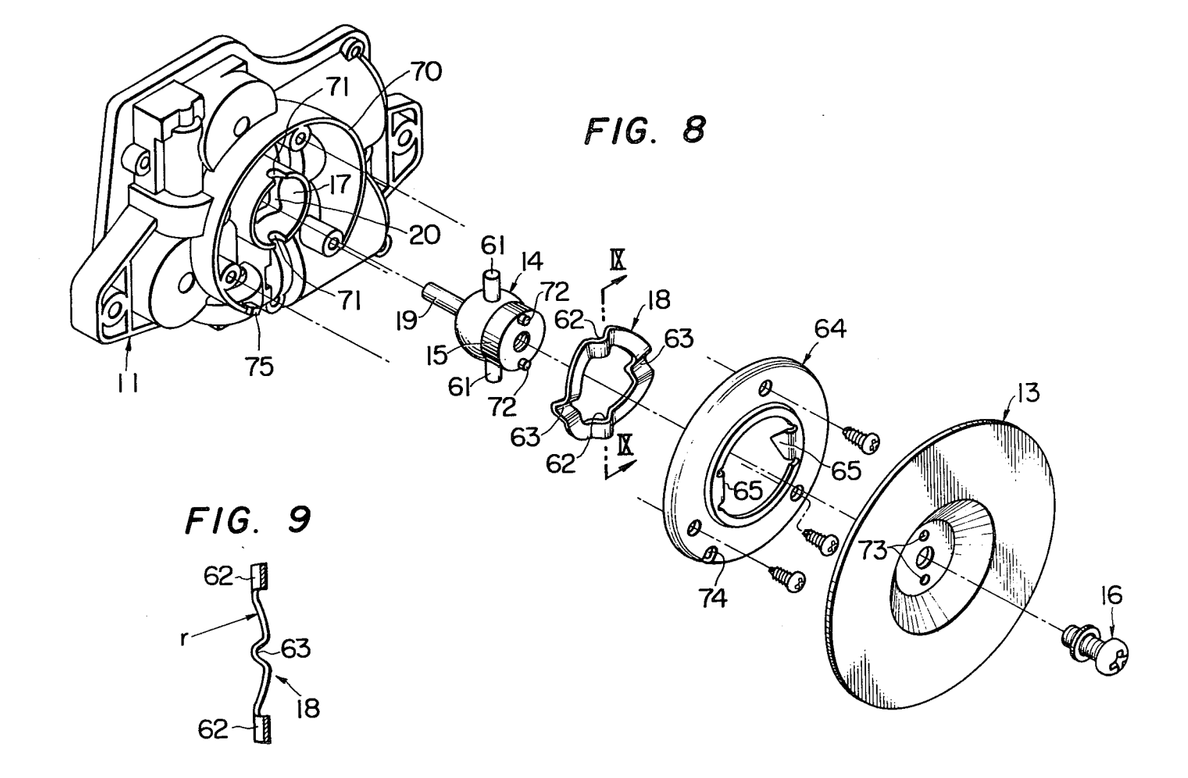
FIG. 8 is an exploded perspective view showing the details of the arrangement of the vicinity of the balland-socket joint in the device, somewhat modified and exaggerated for better understanding.
FIG. 9 is a vertical sectional view of the leaf spring taken along the line IX—IX in FIG. 8.

The ball 14 is seated on the ball-receiving seat 17 of a semi-spherical shape which is formed on a hollow member projecting from the frame. The ball 14 has small shafts 61, 61 which are aligned to extend on the same rectilinear line and arranged perpendicular to both the shaft 19 and the cylinder 15 and which extends from the surface of the ball. These small shafts 61, 61 are fitted in slits 71 and 71 which are provided in the seat 17. A spring 18 has a ring-like shape and has two pairs of either U-shaped or V-shaped grooves 62, 63 and 62, 63 which, in each pair, are arranged to cross each other at right angle. As shown best in FIG. 9 and FIG. 10, the U-shaped or V-shaped grooves 62, 63 in each pair, having their bottoms projecting in directions opposite to each other. A pair of grooves 62 and 62 are in contact with the small shafts 61 and 61 of the ball. An urging plate or holder 64 is screwed to a seat 70 which is provided on the frame. Projections 65, 65 are in contact with the grooves 63, 63 of the other pair. The ball 14 is urged against the seat 17 by this spring plate 18, in such a way that the ball can be rotated under an appropriate resistance or friction. The ball is arranged so that it is nipped between the seat 17 and the spring plate 18 via the holder 64. Since the ball-receiving seat 17 has no resiliency, the ball 14 is always held with a constant torque by the spring plate 18, so that there will never occur a change in the holding due to such reasons as vibrations. The degree of the resistance or torque is selectably set by taking into account the following factors, i.e. the type of material of the spring plate 18, and the relative positional relationship between the small shafts 61, 61 and the shape of the tips of the projections 65, 65. As shown in FIG. 9, as an alternative example, the spring plate 18 as a whole may be curved with a radius of R at the time it is prepared, and then it is assembled in such a way that it is bent in the opposite direction by the urging plate 64 when assembled, to impart the spring plate 18 a required resistance.

As stated above, the small shafts 61, 61 of the ball 14 are fitted in the slits 71, 71. Therefore, the ball-and-socket joint is such that the ball is allowed only to rotate about the small shafts 61, 61 and to rotate about the projections 65, 65 jointly with the spring plate 18. Needless to say, these small shafts and projections correspond in position to the vertical axis and the breadthwise horizontal axis of the body of the automobile. Due to this arrangement, it should be understood that, even when the mirror is displaced from its position by the vibrations of the body of the automobile or by its contact with a person's body or hand or with an object, the mirror can be easily operated again through actuation of the electric motors, since the displacement of the mirror due to such external force as mentioned above is always done in one of the directions associated with the aforesaid directions of rotation and/or their synthesized directions. Therefore, the whole rear view mirror mechanism does not suffer any forced load.

Also, the groove 62 of one pair of the spring plate 18 in such that its inner surface preferably is formed so as to have a radius centering around the center of the ball 14. Whereas, the groove 63 of the other pair of the spring plate 18 is such that its inner surface preferably has a radius centering around the center of the radius of the projections 65 of the holder 64. Such arrangement of grooves allows the following operations that, in both cases, i.e. when the ball 14 and the spring plate 18 rotate about the projections 65, 65 of the urging plate 64 serving as the fulcrums, and when the spring plate 18 is rotated about the small shafts 61, 61 of the ball 14, the ball 14 is rotated in each case with a radius from the projections 65, 65 or small shafts 61, 61 as the fulcrums. As a result, it will be understood that, to whichever position the mirror may have been displaced, the ball is held in the seat 17 in such a way that this ball can be rotated with a constant torque. Accordingly, the operation of the mirror is extremely smoothly performed, and the load of the electric motors is constant, with the result that the causes for disorder of the motors are minimized.

The ball-and-socket joint is assembled by placing the ball 14 in the seat 17, then bringing the spring plate 18 into contact with the small shafts 61, 61 of the ball, and then fixing the urging plate 64 to the frame. All this assembling operation can be carried out only on one side of the apparatus. Thus, here again there has been given a sufficient consideration with respect to easy fabricability. In addition, at the end surface of the hollow member which constitutes the seat for the ball, there are formed slits into which the small shafts 61, 61 are fitted. On the other hand, at the end surface of the cylindrical member 15 of the ball 14, there are formed two pins 72, 72 extending from this end surface. The contacting surface of the cylindrical member of the mirror attachment plate 13 has holes 73, 73 for receiving these pins 72, 72. The urging plate 64 has a cutout 74 formed in its circumferential edge. The seat of the frame has a projection 75 corresponding to this cutout 74. The above-mentioned elements serve to determine the positions and to insure the elements to be supported with each other, at the time these elements are assembled together, thereby the assembling operation is further improved.

The mirror angle adjusting device according to the present invention is secured to the housing 6, together with the mirror, by utilizing a screw hole formed in a lug 76 provided on the frame 11. Electric cables 77, 77a leading from the electric motors 29, 29a are led out after passing through grooves 49, 49a which are provided in the frame 11, and thereafter the cables are passed through the leg or stay 7 of the housing 6, and via a switch 9, they are connected to power source. When the electric motor 29 is actuated via the switch 9, the slidable bar 21 is moved via the worm gear and the rack-and-pinion gear. As a result, the mirror 8 is tilted in the forward as well as the rearward directions as viewed from the driver's seat. When the electric motor 29a is actuated, the mirror 8 is tilted sideways as viewed from the driver's seat. Through these operations, the driver is able to obtain a required rear view, as the driver is sitting in the driver's chamber.

What is claimed is:

1. A mirror angle adjusting device in a remotely controlled rear view mirror apparatus for automobile, comprising:
   a frame;
   a mirror attachment plate;
   a ball to which said mirror attachment plate is secured;
   a ball-and-socket joint for rotatably holding said ball on said frame;
   a shaft extending from the ball at a site different from the site at which the mirror attachment plate is secured to the ball;
   slidable members crossing each other and movably held on said frame;
   slots provided in said slidable members to cross each other at right angle and having said shaft of the ball passing through the point of cross of these slots; and
   driving mechanisms provided on said frame for moving said respective slidable members independently of each other;
   said driving mechanisms comprising:
   electric motors;
   racks provided on said slidable members;
   pinion gears engaging said racks;
   first worm wheels rotatable with said pinion gears;
   first worms engaging these first worm wheels;
   second worm wheels rotatable with said first worms; and
   second worms secured to the shafts of said electric motors and engaging said second worm wheels,
   said worm gears respectively having teeth constituting automatic one-way motion function,
   said pinion gears being coupled to said first worm wheels via slip mechanisms.

2. A mirror angle adjusting device according to claim 1 in which:
   said slip mechanisms comprise:
   tubular holes provided in said first worm wheels;
   teeth formed on the inner circumferences of these tubular holes;
   disks to one surfaces of which are secured said pinion gears;
   blocks provided on the other surfaces of said disks and having a height corresponding to the depth of said tubular hole;
   movable pieces movably accommodated within said blocks and having projections engaging said teeth formed on the inner circumferences of the tubular holes; and
   leaf springs provided within said blocks to contact said movable pieces to insure the engagement of the projections with the teeth.

3. A mirror angle adjusting device according to claim 2, in which:
   said ball-and-socket joint comprises:
   a seat provided on the frame for receiving said ball;
   an opening provided through this ball-receiving seat for the passage therethrough of said shaft of the ball;
   small shafts extending from said ball to cross said shaft at right angle;
   an urging plate secured to the frame and having projections arranged at positions at which these projections cross said small shafts at right angle; and
   a spring plate having grooves engaging both said small shafts and said projections of the urging plate.

4. A mirror angle adjusting device according to claim 3, in which:
   said pinion gers are arranged on said first worm wheels,
   said first worms and said second worm wheels are arranged coaxially,
   said slidable bars and said pinion gears are positioned between said second worms and said first worm wheels and said first worms, and are arranged on planes different from the planes of the second worms, the first worm wheels and the first worms, and
   in one pair of the driving mechanisms, one of said first worms is arranged substantially in parallel with one of said racks, and one of said second worms is positioned to cross said rack at substantially right angle, and
   in the other pair of the driving mechanisms, the other of said first worms is arranged to cross the other of said racks at substantially right angle and the other of said second worms is arranged substantially in parallel with the other of said racks.

5. A mirror angle adjusting device according to claim 4, in which:
   said pinion gears and said worm wheels are accommodated in recesses provided in said frame and are passed through by shafts extending from the bottoms of these recesses,
   said first worms and said second worm wheels are accommodated in recesses provided in said frame and are supported on semi-circular bearings provided on said frame,
   said second worms are supported on semi-circular bearings provided on the frame,
   there being provided a cover secured to the frame, said cover comprising: projections for holding the first worm wheels in cooperation with the recesses; and semi-circular bearings for holding the first worms, the second worm wheels and the second worms in cooperation with said semi-circular bearings of the frame.

6. A mirror angle adjusting device according to claim 5, in which:
   said frame has, formed in the circumference of said ball-receiving seat, slits for receiving said small shafts of the ball, and also has a projection at a position corresponding to the site at which said urging plate is attached,
   said urging plate has a cutout engaging said projection of the frame,
   said ball has pins at positions corresponding to the sites at which the mirror attachment plate is secured to the ball, and
   said mirror attachment plate has small holes for receiving said pins at positions corresponding to the sites of these pins.

7. A mirror angle adjusting device according to claim 3, in which:

the grooves of the spring plate engaging the small shafts having engaging surfaces adapted to engage said small shafts, which surfaces being comprised of curved surfaces having a curvature concentric with said small shafts, the projections of the urging plte have curved surfaces, and those surfaces of the grooves of the spring plate which engage said curved surfaces of said projections are comprised of curved surfaces formed concentrically with the curves of said projections of the urging plate.

* * * * *